(12) United States Patent
Zou et al.

(10) Patent No.: US 9,419,940 B2
(45) Date of Patent: Aug. 16, 2016

(54) IPV4 DATA CENTER SUPPORT FOR IPV4 AND IPV6 VISITORS

(71) Applicant: Futurewei Technologies, Inc., Plano, TX (US)

(72) Inventors: Ting Zou, Cupertino, CA (US); Xushan Lu, Shenzhen (CN); Jing Huang, Shenzhen (CN); Min Zha, Shenzhen (CN); Qian Zhou, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 567 days.

(21) Appl. No.: 13/782,277

(22) Filed: Mar. 1, 2013

(65) Prior Publication Data

US 2013/0232278 A1 Sep. 5, 2013

Related U.S. Application Data

(60) Provisional application No. 61/606,167, filed on Mar. 2, 2012.

(51) Int. Cl.
*H04L 29/12* (2006.01)
*H04L 12/749* (2013.01)
*H04L 12/781* (2013.01)

(52) U.S. Cl.
CPC .......... *H04L 61/251* (2013.01); *H04L 61/1511* (2013.01); *H04L 61/6059* (2013.01); *H04L 61/2038* (2013.01)

(58) Field of Classification Search
CPC . H04L 61/1511; H04L 61/251; H04L 69/167; H04L 29/12066; H04L 29/12358; H04L 29/1249; H04L 61/256; H04L 61/25; H04L 69/08; H04L 12/66; H04L 61/255; H04L 61/2557; H04L 61/6059; H04L 61/6068; H04L 67/14; H04L 29/12443; H04L 61/254; H04L 61/6086; H04L 29/12452; H04L 45/741; H04L 61/2546; H04L 45/00; H04W 80/045; H04W 8/26; H04W 92/02
See application file for complete search history.

(56) References Cited

U.S. PATENT DOCUMENTS

| | | | | |
|---|---|---|---|---|
| 8,014,344 B2 * | 9/2011 | Mahkonen | ............ | H04W 8/082 370/328 |
| 8,041,335 B2 * | 10/2011 | Khetawat | .............. | H04L 63/104 455/404.1 |
| 8,509,185 B2 * | 8/2013 | Haddad | ............. | H04L 29/12358 370/331 |

(Continued)

OTHER PUBLICATIONS

Chen, Z., et al., "DC Migration to IPv6," Network Working Group, Internet Draft, draft-lopez-v6ops-dc-ipv6-00, Mar. 5, 2012, 10 pages.

(Continued)

*Primary Examiner* — Sargon Nano
(74) *Attorney, Agent, or Firm* — Conley Rose, P.C.; Grant Rodolph; William H. Dietrich

(57) ABSTRACT

A network element (NE) comprising a processor configured to transmit a message to a domain names system (DNS) server, wherein the message comprises a virtual service internet protocol (VSIP) version six (VSIPv6) address corresponding to a service associated with an internet protocol version four (IPv4) address. Also disclosed is a method comprising associating a remote host internet protocol (IP) version six (IPv6) address with a private IPv4 address in a stateful binding table, and associating a local service IPv4 address with a local service VSIPv6 address in a stateless binding table.

21 Claims, 6 Drawing Sheets

(56) References Cited

U.S. PATENT DOCUMENTS

| | | | | |
|---|---|---|---|---|
| 8,861,525 | B1* | 10/2014 | Durand | H04L 61/251 370/392 |
| 8,989,196 | B2* | 3/2015 | Haddad | H04L 29/12358 370/351 |
| 9,210,735 | B2* | 12/2015 | Sarikaya | H04L 61/251 |
| 2002/0154624 | A1* | 10/2002 | Oishi | H04L 29/06 370/350 |
| 2002/0181500 | A1* | 12/2002 | Higuchi | H04L 29/12066 370/466 |
| 2003/0084209 | A1* | 5/2003 | Chadalapaka | G06F 3/0601 710/5 |
| 2003/0225912 | A1* | 12/2003 | Takeda | H04L 29/03027 709/246 |
| 2004/0133692 | A1* | 7/2004 | Blanchet | H04L 29/12358 709/230 |
| 2004/0246991 | A1* | 12/2004 | Tsuzuki | H04L 29/12358 370/466 |
| 2005/0066038 | A1* | 3/2005 | Sakamoto | H04L 29/06027 709/227 |
| 2005/0106941 | A1* | 5/2005 | Witchey | H04L 29/06 439/620.09 |
| 2007/0183363 | A1* | 8/2007 | Liden | H04L 29/12066 370/331 |
| 2008/0076425 | A1* | 3/2008 | Khetawat | H04W 88/12 455/436 |
| 2008/0114898 | A1* | 5/2008 | Takeda | H04L 29/06027 709/245 |
| 2008/0304482 | A1* | 12/2008 | Grassi | H04L 29/12358 370/389 |
| 2009/0254984 | A1* | 10/2009 | Nice | H04L 63/0485 726/11 |
| 2010/0296445 | A1* | 11/2010 | Sarikaya | H04L 29/12066 370/328 |
| 2011/0154319 | A1* | 6/2011 | Carter-Schwendler | H04L 69/167 718/1 |
| 2011/0292857 | A1* | 12/2011 | Sarikaya | H04L 29/12358 370/312 |
| 2012/0011234 | A1* | 1/2012 | Xu | H04L 29/12358 709/221 |
| 2012/0072501 | A1* | 3/2012 | Amar | H04L 29/12094 709/206 |
| 2012/0082158 | A1* | 4/2012 | Reddy | H04W 80/045 370/389 |
| 2012/0110210 | A1* | 5/2012 | Huang | H04L 29/12066 709/246 |
| 2012/0207168 | A1* | 8/2012 | Kassi Lahlou | H04L 29/12358 370/392 |
| 2013/0010614 | A1* | 1/2013 | Lin | H04L 12/2898 370/250 |
| 2013/0111065 | A1* | 5/2013 | Donley | H04L 69/22 709/245 |
| 2013/0191412 | A1* | 7/2013 | Kitamura | H04L 61/1511 707/769 |
| 2013/0201999 | A1* | 8/2013 | Savolainen | H04L 29/12066 370/467 |
| 2013/0205035 | A1* | 8/2013 | Chen | H04L 61/1511 709/230 |
| 2013/0212127 | A1* | 8/2013 | Kitamura | H04L 61/1511 707/770 |
| 2013/0235871 | A1* | 9/2013 | Brzozowski | H04L 61/251 370/392 |

OTHER PUBLICATIONS

Bagnulo, M., et al., "Stateful NAT64: Network Address and Protocol Translation from IPv6 Clients to IPv4 Servers," Internet Engineering Task Force, RFC 6146, Apr. 2011, 46 pages.

Bagnulo, M., et al., "DNS64: DNS Extensions for Network Address Translation from IPv6 Clients to IPv4 Servers," Internet Engineering Task Force, RFC 6147, Apr. 2011, 33 pages.

* cited by examiner

IPV4 DATA CENTER SUPPORT FOR IPV4 AND IPV6 VISITORS

CROSS-REFERENCE TO RELATED APPLICATIONS

The present application claims priority to U.S. Provisional Patent Application 61/606,167, filed Mar. 2, 2012 by Ting Zou, et al., and entitled "Method of IPv4 Datacenter Supporting IPv4 and IPv6 Visitors," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The projected exhaustion of Internet Protocol version 4 (IPv4) addresses has become a world-wide reality. The primary telecommunications industry solution to the IPv4 address exhaustion problem is to deploy Internet Protocol version 6 (IPv6) networking. Datacenters may continue to comprise large clusters of legacy servers and other legacy components that employ the IPv4 addressing scheme and are otherwise incompatible with IPv6. Datacenters may continue to receive requests from legacy hosts in IPv4 format as well as receive requests from other hosts in IPv6 format. Simultaneously upgrading all datacenter components to employ both IPv6 networking and IPv4 networking may be cost prohibitive.

SUMMARY

In one embodiment, the disclosure includes a network element (NE) comprising a processor configured to transmit a message to a domain names system (DNS) server, wherein the message comprises a virtual service internet protocol (VSIP) version six (VSIPv6) address corresponding to a service associated with an IPv4 address.

In another embodiment, the disclosure includes a method comprising associating a remote host IPv6 address with a private IPv4 address in a stateful binding table, and associating a local service IPv4 address with a local service VSIPv6 address in a stateless binding table.

In another embodiment, the disclosure includes a system comprising a dual stack load balancer comprising an IPv6 interface and an IPv4 interface, wherein the load balancer is configured to forward an IPv6 prefix to an IPv4 server on the IPv4 interface, receive a VSIPv6 address from the IPv4 server, wherein the VSIPv6 address is based on the IPv4 prefix, and associate the VSIPv6 server address with the IPv4 server address in a stateless binding table.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods to support both IPv4 traffic and IPv6 traffic in an IPv4 datacenter without employing internal datacenter components configured for dual stack (e.g. configured to accept both IPv4 and IPv6 packets.) The IPv4 datacenter may be allocated an IPv6 prefix. Each datacenter service may each create a Virtual Service IPv6 (VSIPv6) address based on the IPv6 prefix and the IPv4 address of the service. As such, the VSIPv6 address of the service may be statelessly mapped to the IPv4 address of the service. The service may then announce the VSIPv6 address to a domain names system (DNS) server. Remote hosts may obtain the VSIPv6 address of the service and transmit packets to the VSIPv6 address. A datacenter component, such as a load balancer may be configured to support dual stack traffic. The load balancer may maintain a private IPv4 address pool for datacenter services. The load balancer may map a remote host's IPv6 address to a private IPv4 address in a binding table. The load balancer may also map the service's VSIPv6 address to the service's IPv4 address in another binding table. The load balancer may then translate traffic between IPv4 and IPv6 using the binding table mappings. The remote host mapping may be a one-to-one mapping and may not be based on a particular session between the remote host and the service, which may reduce the number of mappings when a plurality of sessions are active. The transmission of the VSIPv6 address to the DNS server may also eliminate the need to employ a DNS IPv6 to IPv4 (DNS64) server configuration. The system may also allow an IPv4 service to initiate a session with an IPv6 remote host, which may not be possible when employing a DNS64 server. The systems and methods may also be disclosed in Internet Engineering Task Force (IETF) document draft-lopez-v6ops-dc-ipv6-00, which is incorporated by reference as if fully reproduced herein.

Figure 1:
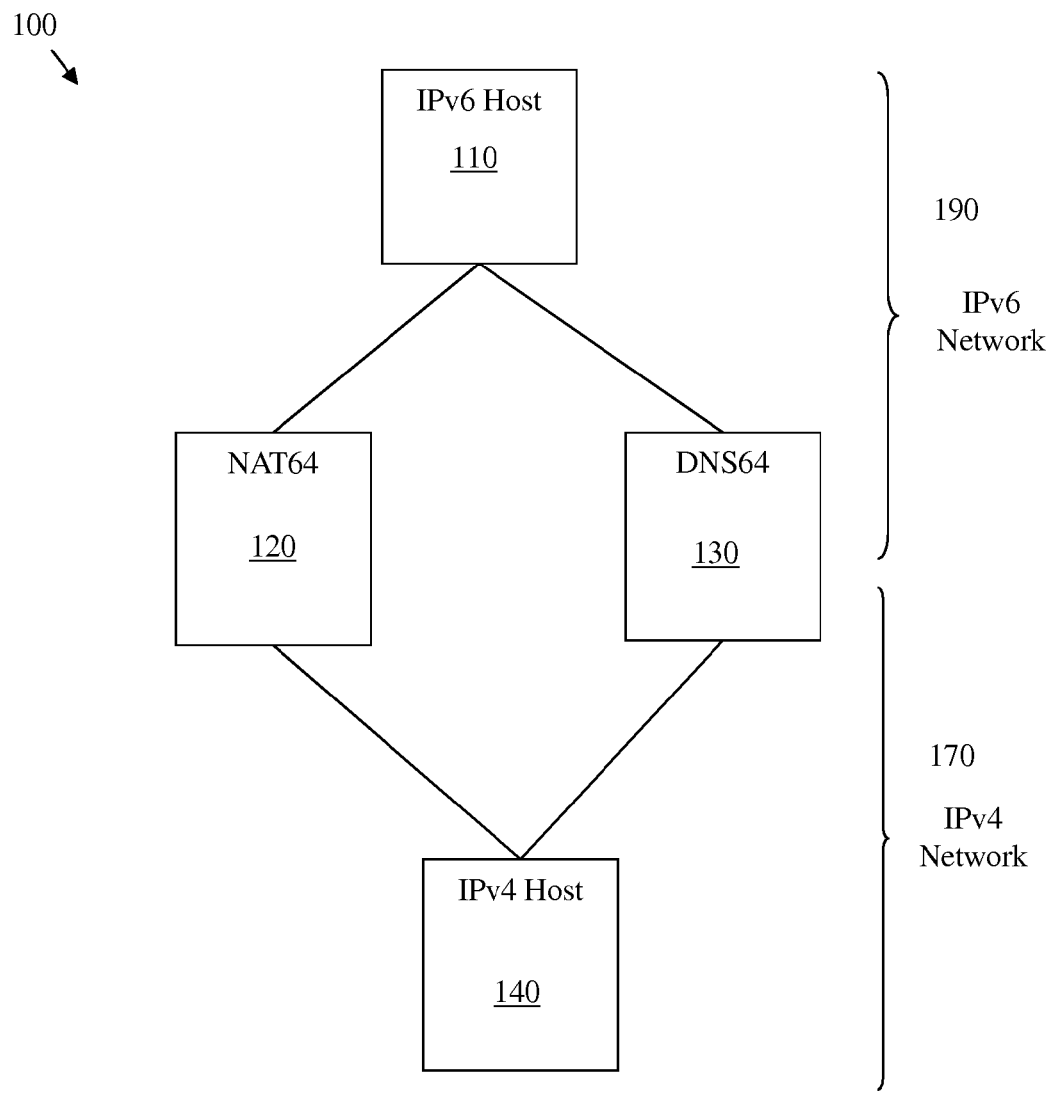
FIG. 1 is a schematic diagram of an embodiment of a mixed IPv6/IPv4 network.

FIG. 1 is a schematic diagram of an embodiment of a mixed IPv6/IPv4 network 100. Network 100 may comprise an IPv6 host 110 positioned in an IPv6 network 190 and an IPv4 host 140 positioned in an IPv4 network 170. A network address translation IPv6 to IPv4 (NAT64) server 120 and a DNS64 server 130 may be positioned at the edge of the IPv6 network 190 as discussed in IETF document request for comment (RFC) 6146, which is hereby incorporated by reference. Host 140 may register a domain name and an associated IPv4 address with the DNS64 server 130 via the IPv4 network 170. The DNS64 server 130 may obtain an IPv6 prefix allocated to the NAT64 server 120 and may generate an IPv6 address for the host 140 based on the IPv6 prefix and the host's 140 IPv4 address. Host 110 may query the DNS64 server 130 to discover the address of host 140 using host's 140 domain name. The DNS64 server 130 may transmit the IPv6 address for host 140 to host 110. Host 110 may transmit an IPv6 message to host 140, which may be routed to the NAT64 server 120 based on the IPv6 prefix used to generate the IPv6 address of host 140. NAT64 server 120 may dynamically allocate an IPv4 address to host 110 and may associate the IPv4 address and the IPv6 address of host 110 in an downstream binding table, which may be stateful. NAT64 server 120 may also associate the IPv4 address and the IPv6 address of host 140 in a upstream binding table, which may also be stateful. NAT64 server 120 may then translate packets transmitted between host 110 and host 140 by translating the packets from IPv6 to IPv4 and vice versa using the bindings in the downstream binding table and the upstream binding table for address translation. As discussed above, the IPv4 addresses may be a scarce resource. As such, the allocation of IPv4 address to host 110 may be temporary and may be tied to a particular packet flow between host 110 and host 140, which may be referred to as a session. When the session is terminated, the allocated IPv4 address for host 110 may be released for use in connection with other IPv6 components. As such, the binding tables may and associations may be made based on session.

Network 100 may require synchronization between NAT64 server 120 and DNS64 server 130 (e.g. to exchange NAT64 server's 120 IPv6 prefix). Also, host 110 may not be able to locate host 130 if host 130 has not been allocated a domain name, even if host 110 is aware of the IPv4 address of host 140 (e.g. because the NAT64 server's 120 IPv6 prefix may be unknown to host 110 without access to DNS64 server 130). Further, initiation of a session by host 140 may not be possible as discussed in RFC 6146. Finally, network 100 may be suitable for cases where few sessions are created between host 110 and host 120. However, when both host 110 and host 140 reside in datacenters, large numbers of sessions may be created which may result in the allocation of multiple IPv4 addresses to host 110 and may result in large an inefficient binding tables that may require expensive high performance NAT64 server's 120 to operate.

Figure 2:
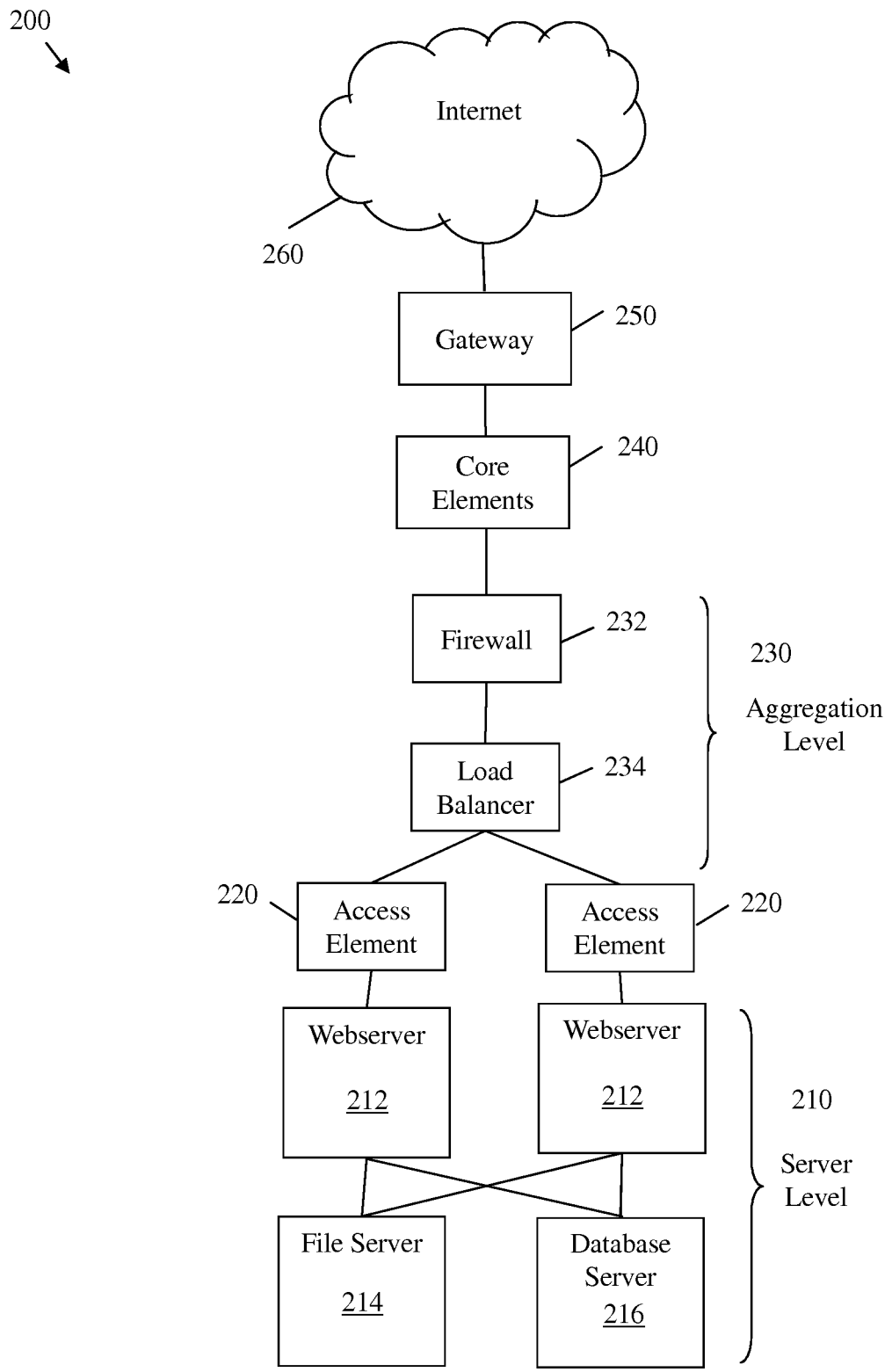
FIG. 2 is a schematic diagram of an embodiment a datacenter network.

FIG. 2 is a schematic diagram of an embodiment a datacenter network 200. Network 200 may comprise a server level 210, which may comprise a plurality of servers, which may comprise webservers 212, database server 216, filer servers 214, and other servers configured to operate in a datacenter. The server level 210 components may host processes, host virtual machines, store data, retrieve data, stream data, and/or perform any other operations to serve requests from client devices, remote hosts, etc. The servers may be connected to access elements 220, which may be configured to transmit data between the servers and other components. Hypervisors may provide connection services that may allow virtual machines to connect to the access elements. The access elements 220 may connect the server level 210 components to an aggregation level 230, which may aggregate data communications from a plurality of servers. The aggregation level may comprise a load balancer 234 for managing data traffic, a firewall 232 for providing security, and other components. The aggregation level 230 components may communicate aggregated data communications to the datacenter network's 200 core elements 240, which may communicate datacenter network traffic to the Internet 260 via a gateway 250. Gateway 250 may be any network node configured to promote interoperability between the datacenter and the Internet 260. It should be noted that a datacenter network 200 may comprise a plurality of the components shown in network 200, as well as other components as needed to provide the functionality of a datacenter.

Figure 3:
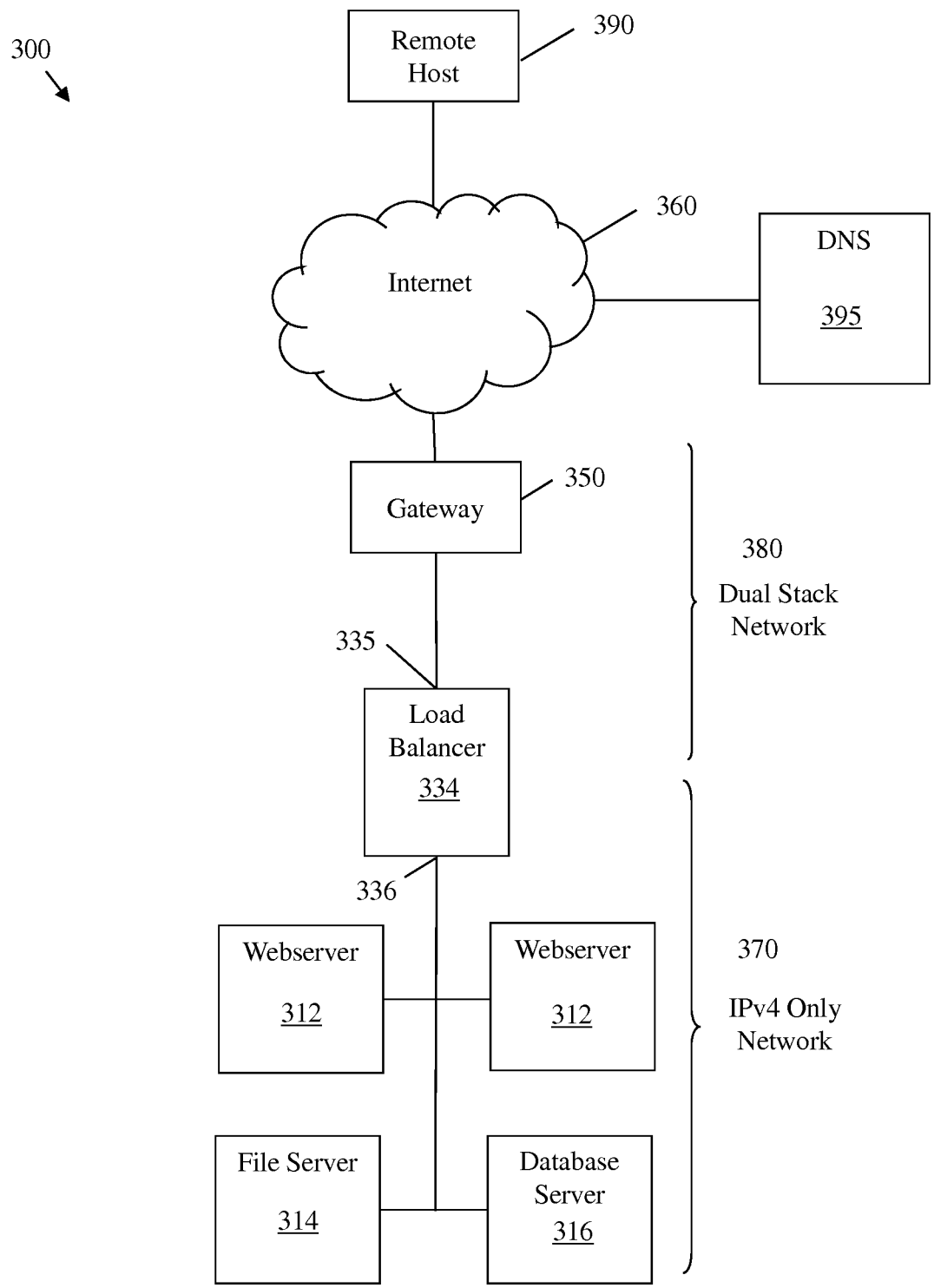
FIG. 3 is a schematic diagram of an embodiment of an IPv4 datacenter network configured to support IPv6 communication.

FIG. 3 is a schematic diagram of an embodiment of an IPv4 datacenter network 300 configured to support IPv6 communication. Network 300 may comprise an Internet 360, a gateway 350, load balancer 334, webservers 312, file server 314, and database server 316, which may be substantially similar to Internet 260, a gateway 250, load balancer 234, webservers 212, file server 214, database server 216. In network 300, webservers 312, file server 314, and database server 316 may be legacy servers and may comprise an IPv4 only network 370. Load balancer 334 may be configured to connect to the IPv4 network 370 via an IPv4 interface 336. The load balancer 334 may also be configured as a dual stack device and may accept both IPv4 data and IPv6 data on a dual stack interface 335. As such, the load balancer 334 may be positioned at the edge of the IPv4 network 370 and a dual stack network 380. The load balancer 334 may be configured to perform network address translation between the dual stack network 380 and the IPv4 network 370.

Network 300 may comprise a remote host 390. The remote host 390 may be a client device, a server, a datacenter, or any device configured to request a service of servers 312, 314, and/or 316. Datacenter servers (e.g. webservers 312, database server 316, and/or file server 314) may be configured to register a domain name and/or an IPv4 address with DNS server 395. If the host 390 is an IPv4 device, the host 390 may query the DNS server 395 to determine the IPv4 address of a particular server based on domain name. Alternatively, the host 390 may be aware of a server's IPv4 address. Remote host 390 may transmit a message toward a server 312, 314, and/or 316. As load balancer 334 comprises a dual stack interface 335, the load balancer may receive a forward the message to the destination server without translation.

Translation may be required for the case where remote host 390 is an IPv6 host. The datacenter may be allocated an IPv6 prefix, for example by the Internet Assigned Numbers Authority (IANA). The load balancer 334 may forward the IPv6 prefix to the servers 312, 314, and/or 316. Each server 312, 314, and/or 316 may generate a VSIPv6 address comprising the IPv6 prefix and embedding the servers IPv4 address. In the case of a virtual server, the IPv4 address may be a Virtual Service IPv4 (VSIPv4) address. The servers 312, 314, and/or 316 may transmit the VSIPv6 address and/or a domain name to the DNS server 395 in an IPv4 packet. The load balancer 335 may translate the packet into an IPv6 packet. Alternatively, the load balancer 334 may receive an IPv4 address from each server and may generate the VSIPv6 address on behalf of the server 312, 314, and/or 316, and may forward and/or cause the VSIPv6 address to be forwarded to the DNS server 395 in an IPv6 packet. As the DNS server 395 may receive the VSIPv6 addresses in IPv6 format, DNS server 395 may not employ DNS64 functionality. Remote host 390 may obtain the VSIPv6 address from DNS server 395 and/or from any other source. Remote host 390 may transmit IPv6 packets to a server, for example database server 316, by setting the packets destination address as the VSIPv6 address generated by the database server 316. As the VSIPv6 address may be based on the datacenter IPv6 prefix, the packet may be routed to load balancer 334. Load balancer 334 may receive the packet on the dual stack interface 335, translate the packet to IPv4 format, translate the VSIPv6 address to the corresponding IPv4 address and forward the packet to the appropriate server. The signaling between host 390 and servers 312, 314, and/or 316 may be discussed in greater detail with reference to FIG. 4 below.

A load balancer 334 may be positioned in the aggregation level 230 as shown in FIG. 2. A person of ordinary skill in the art will understand that the functionality of load balancer 334 may positioned in any desired datacenter level to create an IPv4/IPv6 network edge device at that level. For example, the functionality of load balancer 334 may be employed in an access element, such as access element 220, to allow an IPv4 server and/or server cluster to connect to an IPv6 and/or dual stack datacenter network. As another example, the functionality of load balancer 334 may be employed in a core element, such as core element 240, which may allow the IPv4 network to stretch beyond the aggregation level firewall (e.g. firewall 232). These embodiments are included in the present disclosure.

Figure 4:
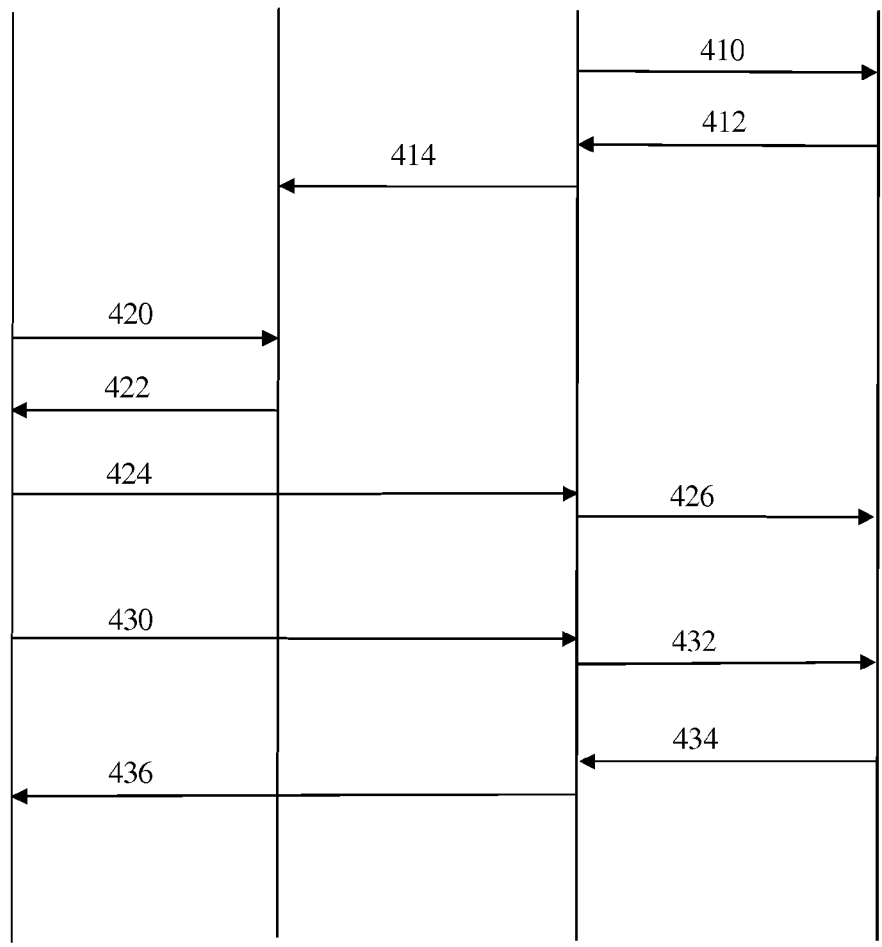
FIG. 4 is a signaling diagram of an embodiment of a method of communication between IPv4 and IPv6 networks.

FIG. 4 is a signaling diagram of an embodiment of a method 400 of communication between IPv4 and IPv6 networks. At step 410, a load balancer, such as load balancer 334, may transmit a datacenter IPv6 prefix to an IPv4 service (e.g. webservers 312, file server 314, and/or database server 316.) The IPv4 service may generate a VSIPv6 address based on the IPv6 prefix. At step 412, the IPv4 service may transmit the VSIPv6 prefix and/or an associated domain name to the load balancer in an IPv4 packet. The load balancer may create and/or update a stateless binding table and/or mapping rule by associating the VSIPv6 address with the corresponding IPv4 address of the service. At step 414, the load balancer may translate the IPv4 packet into an IPv6 packet and transmit the VSIPv6 address to a DNS server, such as DNS server 395. The DNS server may receive the packet and save an association between the domain name and the service VSIPv6 address. Alternatively, the load balancer may request and receive the IPv4 address (e.g. a VSIPv4 address) of the IPv4 service in steps 410 and 412, in which case the load balancer may generate the VSIPv6 address on behalf of the service.

At a later time, an IPv6 host (e.g. remote host 390), may wish to contact the IPv4 service. The IPv6 host may be aware of a domain name of the IPv4 service. At step 420, the IPv6 host may transmit a DNS query comprising the domain name of the IPv4 service to the DNS server. At step 422, the DNS server may reply with the VSIPv6 address of the IPv4 service. In the alternative, the IPv6 host may be aware of the VSIPv6 address of the IPv4 service, in which case steps 420 and/or 422 may be omitted. This may be the case if an IPv4 service has no associated domain name.

At step 424, the IPv6 host may transmit a packet toward the IPv4 host by setting the destination address of the packet as the VSIPv6 address. As the VSIPv6 address comprises the datacenter IPv6 prefix, the packet sent at step 424 may be received by the load balancer. The load balancer may be configured with a pool of private IPv4 addresses. The load balancer may allocate an IPv4 address to the IPv6 host and may associate the hosts IPv6 address with the allocated IPv4 address in a stateful binding table. The association may be a one-to-one association and may not be based on a session and/or on a particular packet flow. At step 426, the load balancer may translate the packets source address from the IPv6 address of the host to the allocated private IPv4 address based on the stateful binding table, translate the VSIPv6 destination address to the associated IPv4 address based on the stateless binding table, translate the packet to IPv4 format, and forward the packet to the IPv6 service.

At step 430, the IPv6 host may transmit additional packets toward the IPv4 service by setting the packet destination address to the IPv4 service VSIPv6 address. At step 432, the load balancer may receive the packets, translate them from IPv6 format to IPv4 format as discussed with reference to step 426, and forward them to the IPv4 service. At step 434, the IPv4 service may respond by transmitting an IPv4 packet toward the IPv6 host. The IPv4 packet destination may be set to the private IPv4 address allocated to the IPv6 host and the source may be set to the IPv4 address of the IPv4 service. At step 436, the load balancer may receive the packet, translate the source address from the service IPv4 address to the VSIPv6 address based on the stateless table, translate the destination address from the private allocated IPv4 host address to the IPv6 host address based on the stateful binding table, translate the packet from IPv4 format to IPv6 format, and forward the packet to the IPv6 host.

As discussed above, the binding table associations discussed herein may not be session based and may instead be associations based solely on the IP addresses of the IPv6 host in the stateful binding table and the IPv4 service in the stateless binding table, respectively. As such, each table may comprise a single entry regardless of the number of active sessions between the IPv6 host and the IPv4 service. In the case that the IPv6 host is positioned in a datacenter, a large number of sessions may be active between the IPv6 host and the IPv4 service at a specified time. This may result in a large complex binding table in network 100 and may result in a small efficient table when network 300 and/or method 400 is employed. A smaller more efficient binding table may be managed by a less powerful and less expensive load balancer, which may allow for more cost efficient datacenter design.

Figure 5:
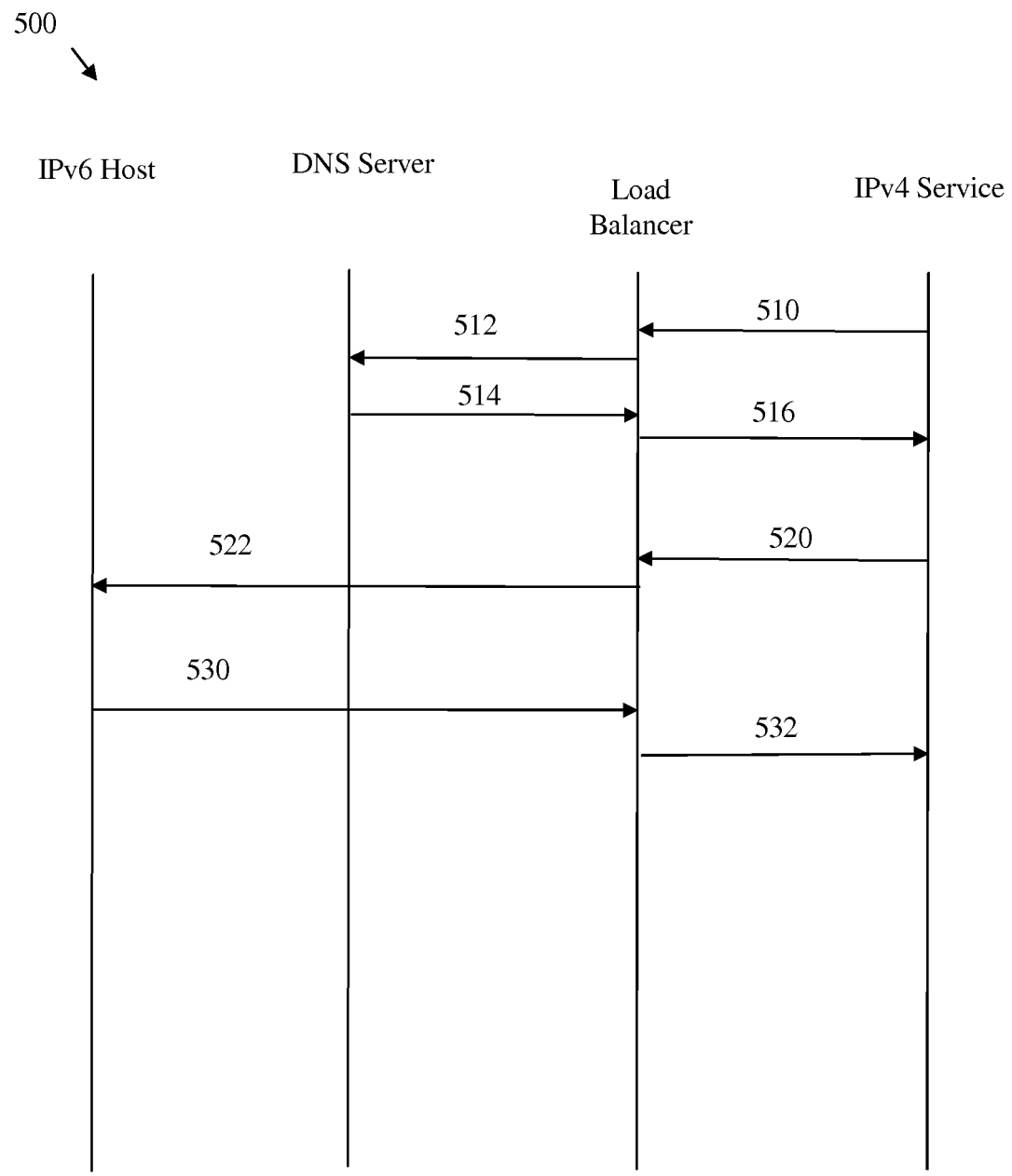
FIG. 5 is a signaling diagram of another embodiment of a method of communication between IPv4 and IPv6 networks.

FIG. 5 is a signaling diagram of another embodiment of a method 500 of communication between IPv4 and IPv6 networks. Method 500 may be similar to method 400, but communications may be initiated by the IPv4 service via the load balancer. At step 510, the IPv4 service may transmit a query toward the DNS server to obtain the IP address information of the IPv6 host using a domain name. The load balancer may receive the query. At step 512, the load balancer may translate the query from IPv4 format to IPv6 format and transmit the query to the DNS server. At step 514, the DNS server may reply with the IPv6 address of the IPv6 host. The load balancer may allocate a private IPv4 address to the IPv6 host and associate the allocated IPv4 address with the IPv6 address in a stateful binding table as in step 424. At step 516, the load balancer may forward the allocated IPv4 address of the IPv6 host to the IPv4 service.

At step 520, the IPv4 service may initiate a session with the IPv6 host by transmitting a data packet toward the IPv6 host by setting the data packet destination as the host's allocated IPv4 address and the data packet source as the services IPv4 address. The load balancer may already be aware of the IPv4 service's VSIPv6 address (e.g. based on step 410 and/or step 412). At step 522, the load balancer may translate the packet destination from the host's allocated IPv4 address to the host's IPv6 address based on the stateful binding table, translate the source address from the services IPv4 address to the services VSIPv6 address based on a stateless binding table, translate the packet into IPv6 format, and forward the packet to the IPv6 host. The IPv6 host may receive the packet of step 522 and may obtain the VSIPv6 address of the IPv4 service from the packet of step 522.

Prior to step 530, the IPv6 host may be aware of the VSIPv6 address of the IPv4 service based on step 522 regardless of whether the IPv4 service has a domain name. As such no DNS query may be needed. At step 530, the IPv6 host may transmit a packet toward the IPv4 service by setting the source address as the IPv6 address of the host and the destination address as the VSIPv6 address of the service. At step 532, the load balancer may translate the addresses using the binding tables as discussed above and forward the packet to the IPv4 service. In this way, an IPv4 service may initiate a communication with a remote IPv6 host, which may not be possible in network 100.

Figure 6:
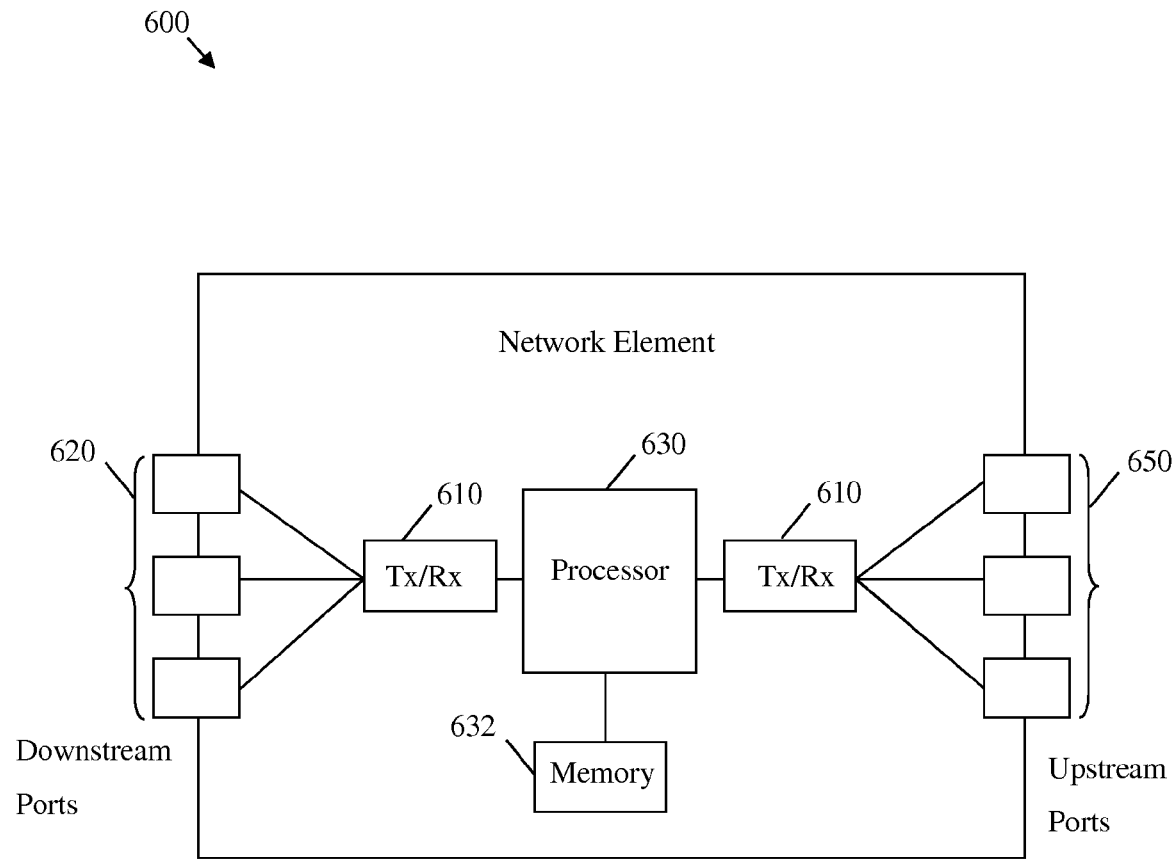
FIG. 6 is a schematic diagram of an embodiment of a NE.

FIG. 6 is a schematic diagram of an embodiment of a network element (NE) 600, which may comprise a server 212, 214, 216, 312, 314, and/or 316, an access element 220, a load balancer 234 and/or 334, a firewall 232, core elements 240, gateway 250 and/or 350, DNS 395, and/or remote host 390. One skilled in the art will recognize that the term NE encompasses a broad range of devices of which NE 600 is merely an example. NE 600 is included for purposes of clarity of discussion, but is in no way meant to limit the application of the present disclosure to a particular NE embodiment or class of NE embodiments. At least some of the features/methods described in the disclosure, for example communication methods 400 and/or 500, may be implemented in in a network apparatus or component such as an NE 600. For instance, the features/methods in the disclosure may be implemented using hardware, firmware, and/or software installed to run on hardware. The NE 600 may be any device that transports frames through a network, e.g., a switch, router, bridge, server, a client, etc. As shown in FIG. 6, the NE 600 may comprise transceivers (Tx/Rx) 610, which may be transmitters, receivers, or combinations thereof. A Tx/Rx 610 may be coupled to plurality of downstream ports 620 for transmitting and/or receiving frames from other nodes, a Tx/Rx 610 coupled to plurality of upstream ports 650 for transmitting and/or receiving frames from other nodes. For example, Tx/Rx 610 and downstream ports 650 may comprise dual stack interface 335, while upstream ports 620 may comprise IPv4 interface 336. A processor 630 may be coupled to the Tx/Rxs 610 to process the frames and/or determine which nodes to send frames to. The processor 630 may comprise one or more multi-core processors and/or memory devices 632, which may function as data stores, buffers, etc. Processor 630 may be implemented as a general processor or may be part of one or more application specific integrated circuits (ASICs) and/or digital signal processors (DSPs). The downstream ports 620 and/or upstream ports 650 may contain electrical and/or optical transmitting and/or receiving components. NE 600 may or may not be a routing component that makes routing decisions.

It is understood that by programming and/or loading executable instructions onto the NE 600, at least one of the processor 630, downstream ports 620, Tx/Rxs 610, memory 632, and/or upstream ports 650 are changed, transforming the NE 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, Ru, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network element (NE) comprising:
   a transmitter and a receiver, wherein the transmitter and the receiver communicate with a first Internet protocol version six (IPv6) remote host, a domain names system (DNS) server via an IPv6 network, and an internet protocol version four (IPv4) service via an IPv4 network;
   a processor coupled to the transmitter and the receiver, wherein the processor:
      transmits, via the transmitter, a message to the DNS server to support domain name resolution for the IPv4 service, wherein the message comprises a virtual service internet protocol (VSIP) version six (VSIPv6) address corresponding to the IPv4 service;
      receives, via the receiver, a first IPv6 packet from the first IPv6 remote host, wherein the first IPv6 packet comprises a source address set to an IPv6 address of the first IPv6 remote host;
      dynamically allocates an IPv4 address for the first IPv6 remote host from a private IPv4 address pool to facilitate communication between the first IPv6 remote host and the IPv4 service; and
      creates a sessionless binding between the allocated IPv4 address and the IPv6 address of the first IPv6 remote host independent of any communication session between the first IPv6 remote host and the IPv4 service; and
   a memory coupled to the processor,
   wherein the memory comprises a binding table storing a sessionless binding entry comprising the allocated IPv4 address and the IPv6 address of the first IPv6 remote host, and
   wherein the NE is a dual stack load balancer operable in a datacenter aggregation network, the dual stack load balancer comprising the transmitter, processor, receiver, and memory.

2. The NE of claim 1, wherein the IPv4 service is hosted in an IPv4 datacenter, wherein an IPv6 prefix is allocated to the IPv4 datacenter, and wherein the VSIPv6 address is based on the IPv6 prefix.

3. The NE of claim 1, wherein the processor:
   receives, via the receiver, a second IPv6 packet from the first IPv6 remote host, wherein the second IPv6 packet comprises a source address set to the IPv6 address of the first IPv6 remote host; and
   converts the second IPv6 packet to a second IPv4 packet by setting the source address to the IPv4 address of the first IPv6 remote host based on the sessionless binding.

4. The NE of claim 3, wherein the second IPv6 packet comprises a destination address set to the VSIPv6 address of the IPv4 service, and wherein the processor:
   converts the second IPv6 packet to the second IPv4 packet by setting the destination address to an IPv4 address of the IPv4 service based on a VSIP address mapping rule; and
   forwards via the transmitter, the second IPv4 packet toward the IPv4 service.

5. The NE of claim 1, wherein the processor:
   receives, via the receiver, a third IPv4 packet from the IPv4 service, wherein the third IPv4 packet comprises a source address set to an IPv4 address of the IPv4 service; and
   converts the third IPv4 packet to a third IPv6 packet by setting the source address to the VSIPv6 address of the IPv4 service based on a VSIP address mapping rule.

6. The NE of claim 5, wherein the third IPv4 packet comprises a destination address set to the IPv4 address of the first IPv6 remote host, and wherein the processor:
   converts the third IPv4 packet to the third IPv6 packet by setting the destination address to the IPv6 address of the first IPv6 remote host based on the sessionless binding; and
   forwards via the transmitter, the third IPv6 packet toward the first IPv6 remote host.

7. The NE of claim 1, wherein the DNS server is not a DNS IPv6 to IPv4 (DNS64) server.

8. The NE of claim 1, wherein the processor initiates a session with a second IPv6 remote host on behalf of the IPv4 service.

9. The NE of claim 1, wherein an IPv4 address of the IPv4 service is a VSIP version four (VSIPv4) address.

10. A method implemented by a network element (NE), comprising:
    transmitting, via a transmitter of the NE, a message to a domain names system (DNS) server to support domain name resolution for an Internet protocol version four (IPv4) service, wherein the message comprises a virtual service internet protocol (VSIP) version six (VSIPv6) address corresponding to the IPv4 service;
    receiving, via a receiver of the NE, a first Internet protocol version six (IPv6) packet from an IPv6 remote host, wherein the first IPv6 packet comprises a source address set to an IPv6 address of the IPv6 remote host;
    allocating, via a processor of the NE, an IPv4 address for the IPv6 remote host dynamically from a private IPv4 address pool to facilitate communication between the IPv6 remote host and the IPv4 service;
    creating, via the processor, a sessionless binding between the allocated IPv4 address and the IPv6 address of the first IPv6 remote host independent of any communication session between the first IPv6 remote host and the IPv4 service; and
    storing, in a memory of the NE, a sessionless binding entry in a binding table, the sessionless binding entry comprising the allocated IPv4 address and the IPv6 address of the first IPv6 remote host,
    wherein the NE is a dual stack load balancer operable in a datacenter aggregation network the dual stack load balancer comprising the transmitter, processor, receiver, and memory.

11. The method of claim 10, wherein the IPv4 service is hosted in an IPv4 datacenter, wherein an IPv6 prefix is allocated to the IPv4 datacenter, and wherein the VSIPv6 address is based on the IPv6 prefix.

12. The method of claim 10, further comprising:
    receiving, via the receiver, a second IPv6 packet from the IPv6 remote host, wherein the second IPv6 packet comprises a source address set to the IPv6 address of the IPv6 remote host; and
    converting, via the processor, the second IPv6 packet to a second IPv4 packet by setting the source address to the IPv4 address of the IPv6 remote host based on the sessionless binding.

13. The method of claim 12, wherein the second IPv6 packet comprises a destination address set to the VSIPv6 address of the IPv4 service, and wherein the method further comprises:
converting, via the processor, the second IPv6 packet to the second IPv4 packet by setting the destination address to an IPv4 address of the IPv4 service based on a VSIP address mapping rule; and
forwarding, via the transmitter, the second IPv4 packet toward the IPv4 service.

14. The method of claim 10, further comprising:
receiving, via the receiver, a third IPv4 packet from the IPv4 service, wherein the third IPv4 packet comprises a source address set to an IPv4 address of the IPv4 service; and
converting, via the processor, the third IPv4 packet to a third IPv6 packet by setting the source address to the VSIPv6 address of the IPv4 service based on a VSIP address mapping rule.

15. The method of claim 14, wherein the third IPv4 packet comprises a destination address set to the IPv4 address of the IPv6 remote host, and wherein the method further comprises:
converting, via the processor, the third IPv4 packet to the third IPv6 packet by setting the destination address to the IPv6 address of the IPv6 remote host based on the sessionless binding; and
forwarding, via the transmitter, the third IPv6 packet toward the IPv6 remote host.

16. A non-transitory medium storing a computer program product comprising computer executable instructions that when executed by a processor cause the processor to:
transmit, via a transmitter, a message to a domain names system (DNS) server to support domain name resolution for an Internet protocol version four (IPv4) service, wherein the message comprises a virtual service internet protocol (VSIP) version six (VSIPv6) address corresponding to the IPv4 service;
receive, via a receiver, a first Internet protocol version six (IPv6) packet from an IPv6 remote host, wherein the first IPv6 packet comprises a source address set to an IPv6 address of the IPv6 remote host;
allocate an IPv4 address for the IPv6 remote host dynamically from a private IPv4 address pool to facilitate communication between the IPv6 remote host and the IPv4 service;
create a sessionless binding between the allocated IPv4 address and the IPv6 address of the first IPv6 remote host independent of any communication session between the first IPv6 remote host and the IPv4 service; and
store a sessionless binding entry comprising the allocated IPv4 address and the IPv6 address of the first IPv6 remote host,
wherein the sessionless binding entry is stored in a binding table in a memory, and
wherein the non-transitory medium, the processor, the receiver, the transmitter, and the memory are positioned in a dual stack load balancer operable in a datacenter aggregation network.

17. The non-transitory medium of claim 16, wherein the IPv4 service is hosted in an IPv4 datacenter, wherein an IPv6 prefix is allocated to the IPv4 datacenter, and wherein the VSIPv6 is based on the IPv6 prefix.

18. The non-transitory medium of claim 16, wherein the instructions further cause the processor to:
receive a second IPv6 packet from the IPv6 remote host, wherein the second IPv6 packet comprises a source address set to the IPv6 address of the IPv6 remote host; and
convert the second IPv6 packet to a second IPv4 packet by setting the source address to the IPv4 address of the IPv6 remote host based on the sessionless binding.

19. The non-transitory medium of claim 18, wherein the second IPv6 packet comprises a destination address set to the VSIPv6 address of the IPv4 service, and wherein the instructions further cause the processor to:
convert the second IPv6 packet to the second IPv4 packet by setting the destination address to an IPv4 address of the IPv4 service based on a VSIP address mapping rule; and
forward the second packet IPv4 toward the IPv4 service.

20. The non-transitory medium of claim 16, wherein the instructions further cause the processor to:
receive a third IPv4 packet from the IPv4 service, wherein the third IPv4 packet comprises a source address set to an IPv4 address of the IPv4 service; and
convert the third IPv4 packet to a third IPv6 packet by setting the source address to the VSIPv6 address of the IPv4 service based on a VSIP address mapping rule.

21. The non-transitory medium of claim 20, wherein the third IPv4 packet comprises a destination address set to the IPv4 address of the IPv6 remote host, and wherein the instructions further cause the processor to:
convert the third IPv4 packet to the third IPv6 packet by setting the destination address to the IPv6 address of the IPv6 remote host based on the sessionless binding; and
forward the third IPv6 packet toward the IPv6 remote host.

* * * * *